United States Patent [19]

Bibollet et al.

[11] Patent Number: 4,823,903
[45] Date of Patent: Apr. 25, 1989

[54] MOTORIZED SNOW VEHICLE

[75] Inventors: Jean-Claude Bibollet, Thones; Alain Isambert, Charvonnex, both of France

[73] Assignee: Bibollet S.A., Bons En Chablais, France

[21] Appl. No.: 46,887
[22] PCT Filed: Aug. 6, 1986
[86] PCT No.: PCT/FR86/00281
§ 371 Date: Apr. 8, 1987
§ 102(e) Date: Apr. 8, 1987
[87] PCT Pub. No.: WO87/01085
PCT Pub. Date: Feb. 26, 1987

[30] Foreign Application Priority Data

Aug. 13, 1985 [FR] France .................... 85 13288

[51] Int. Cl.$^4$ .............................................. B62D 55/06
[52] U.S. Cl. .................... 180/193; 180/9.25; 180/9.56; 180/291
[58] Field of Search ............... 180/190, 191, 192, 193, 180/182, 183, 184, 185, 9.5, 9.54, 9.56, 219, 9.25, 9.23, 9.21, 9.26, 291

[56] References Cited

U.S. PATENT DOCUMENTS

| Re. 26,775 | 1/1970 | Smieja | 180/193 |
|---|---|---|---|
| 499,171 | 6/1893 | Loree | 235/16 |
| 743,755 | 11/1903 | Ruggles | 180/219 |
| 1,682,622 | 8/1928 | Löfström et al. | 180/193 |
| 3,336,994 | 8/1967 | Pederson | 180/185 |
| 3,447,621 | 6/1969 | Schoonover | 180/9.56 |
| 3,721,308 | 3/1973 | Brandli et al. | 180/193 |
| 3,783,958 | 1/1974 | Canavan | 180/184 |
| 3,822,755 | 7/1974 | Hine | 180/185 |
| 3,840,083 | 10/1974 | Woods | 180/312 |
| 3,871,460 | 3/1975 | Dehnert | 180/190 |
| 3,879,092 | 4/1975 | Rose | 305/24 |
| 3,981,373 | 9/1976 | Irvine | 180/9.54 X |
| 4,437,534 | 3/1984 | Grinde | 180/190 |
| 4,502,560 | 3/1985 | Hisatomi | 180/9.54 X |
| 4,520,890 | 6/1985 | Marier | 180/193 |
| 4,613,006 | 9/1986 | Moss et al. | 180/190 X |

FOREIGN PATENT DOCUMENTS

| 972783 | 8/1975 | Canada | 180/193 |
|---|---|---|---|
| 175543 | 4/1905 | Fed. Rep. of Germany | 180/219 |
| 427635 | 12/1924 | Fed. Rep. of Germany | 180/219 |
| 2824528 | 12/1979 | Fed. Rep. of Germany | 180/190 |
| 2093248 | 1/1972 | France | |
| 2037678 | 7/1980 | United Kingdom | |

Primary Examiner—Chales A. Marmor
Assistant Examiner—Everett G. Diederiks, Jr.
Attorney, Agent, or Firm—Sandler & Greenblum

[57] ABSTRACT

Motorized snow vehicle composed of a front steering assembly and a rear support assembly including a support chassis and a motor activating a tread, the front steering assembly having a steering column adapted to pivot on the chassis and which carries at its lower portion a front runner or ski and at its upper portion handlebars or the like, wherein the chassis includes a main support beam extending towards the rear above which the motor is attached.

20 Claims, 4 Drawing Sheets

Fig. 6
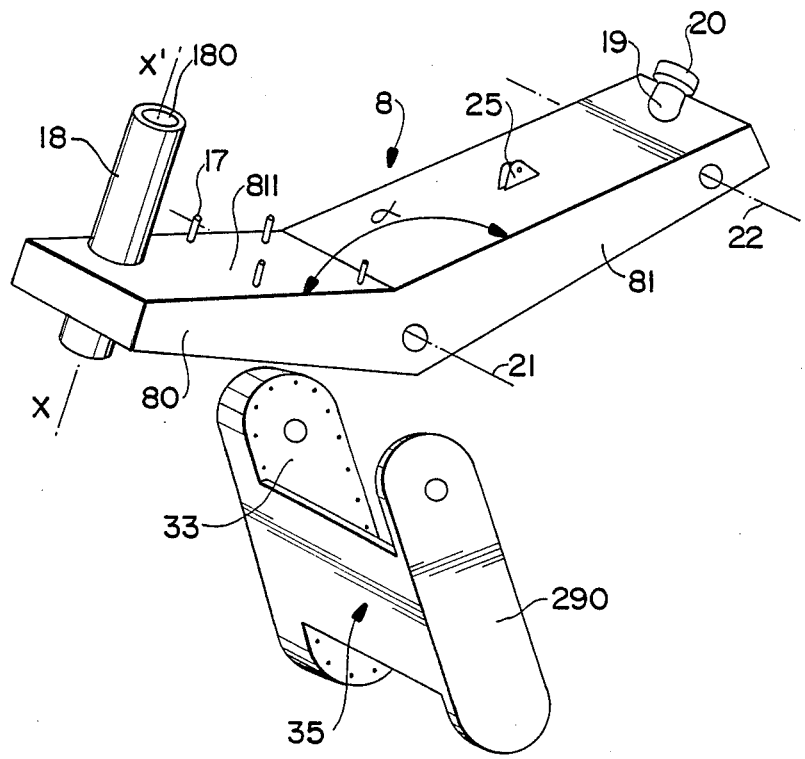
Fig. 7
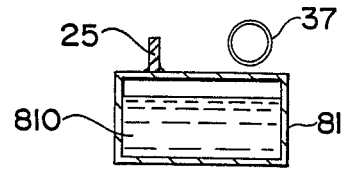
Fig. 8

MOTORIZED SNOW VEHICLE

BACKGROUND OF THE INVENTION

1. Field of the Invention

The present invention relates to a vehicle and particularly to a vehicle adapted for movement in the snow. The invention relates more particularly to an improvement of this type of vehicle.

2. Discussion of Background and Material Information

Numerous vehicles are known which are adapted to move on snow. Such conventional vehicles are commonly referred to as snow mobiles or snow machines and are typically composed of a rear support assembly equipped with a motor for activating a tread, and a steering mechanism in the front including journalled handlebars connected to one or more skis by a steering column. The vehicle described in U.S. Pat. No. 3,645,347 is a representative example of prior art snow machines. This type of motorized snow vehicle includes an assembly of numerous elements. These snow vehicles are thus heavy, expensive, unreliable and particularly awkward.

SUMMARY OF THE INVENTION

The present invention thus attempts to overcome these various disadvantages and proposes a particularly simple and reliable vehicle. To this end the vehicle according to the present invention includes a front steering assembly and a rear support assembly composed of a support chassis and a motor for activating a tread. The front steering assembly includes a pivotable steering column on the chassis connected at its lower portion to a front runner or ski and at its upper portion to a handlebar or similar steering mechanism.

A unique and novel feature of the snow machine of the present invention is that the chassis is composed of a principaL beam extending towards the rear above which the motor is positioned. Preferably, the motor is attached above the front portion of the chassis and behind the steering column.

According to one preferred embodiment of the invention, the chassis is composed of a hollow beam which serves as a reservoir adapted to hold fuel for the motor.

According to another embodiment of the invention, the chassis forms in the longitudinal vertical plane of the vehicle, an obtuse angle which opens upwardly.

In accordance with the invention, the motor is positioned sufficiently high to be protected from snow and, if the air has cooled, such a placement of the motor makes it possible to warm the driver. Furthermore inasmuch as the starter is positioned in the vicinity of the driver it is relatively easy to start the motor while the driver is seated on the machine.

BRIEF DESCRIPTION OF THE DRAWING

Other characteristics and advantages of the invention will become clear from the description which follows with reference to the annexed drawings which are given by way of non-limiting example only.

FIG. 6 is a perspective view of the chassis and of the front retention arm of the tread support.

FIG. 7 is a cross section along VII—VII of the chassis.

FIG. 8 is cross sectional view along VIII—VIII of the chassis.

DETAILED DESCRIPTION

Figure 1:
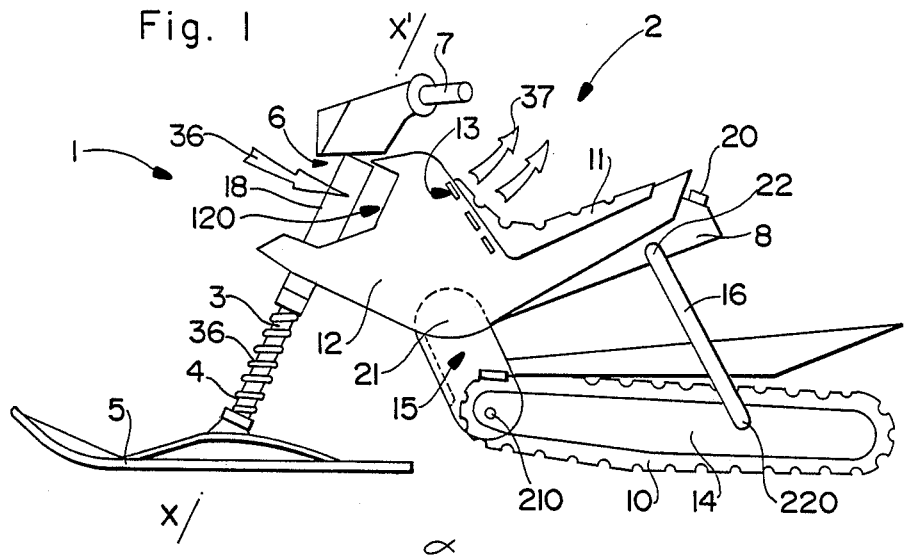
FIG. 1 is a lateral exterior view showing the motorized snow vehicle according to the invention.
Figure 2:
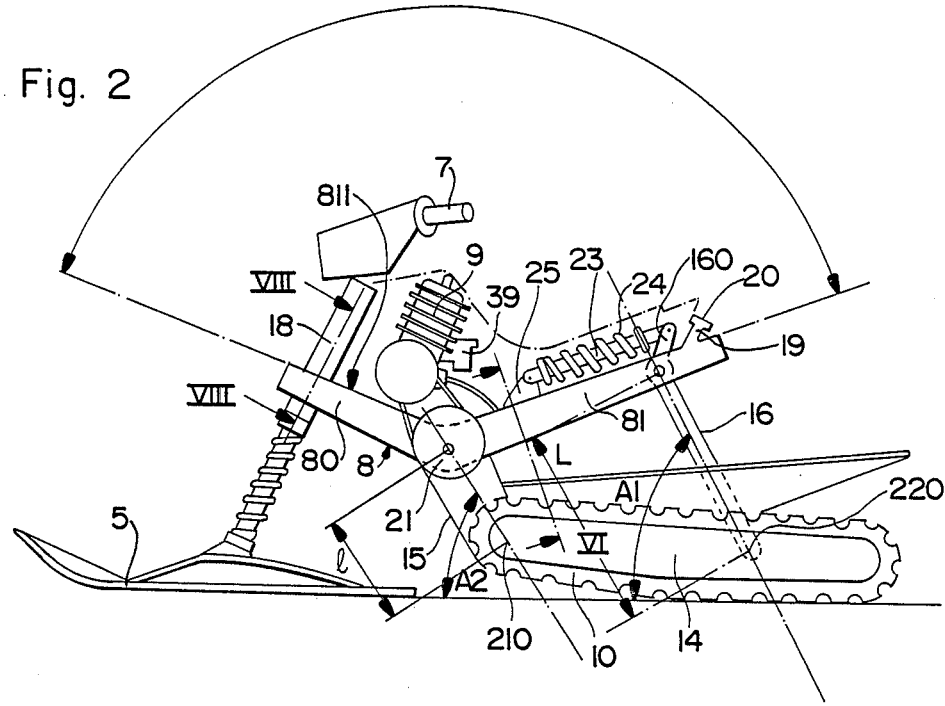
FIG. 2 is a side view of the vehicle without its aerodynamic shell.
Figure 3:
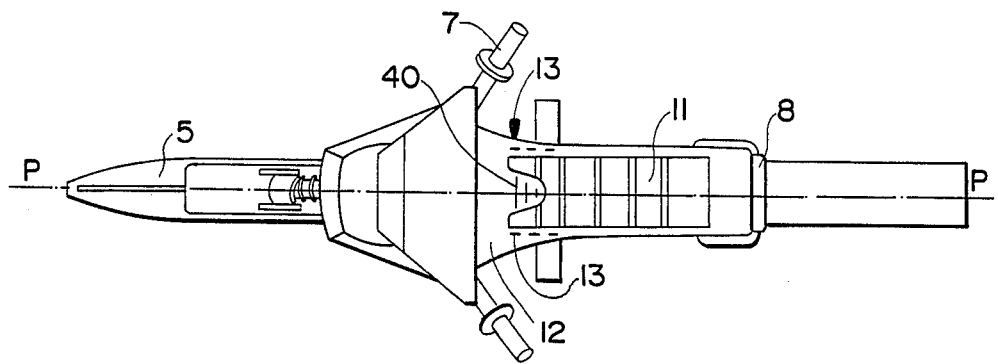
FIG. 3 is a top view of FIG. 1.

As illustrated in the drawings, the motorized snow vehicle is constituted by a front steering assembly (1) journalled around an axis (XX') on a rear support assembly (2). The front steering assembly (1) includes a steering column (3) connected at its lower portion (4) to a front runner or ski (5) and at its upper end (6) to handlebars or similar means for steering (7). The rear support assembly (2) includes a chassis (8), a motor (9) for activating a tread (10), and a seat (11) adapted to support the driver. The motor is preferably positioned in an aerodynamic shell (12) assuring a pleasing asthetic appearance to the motorized snow vehicle as well as serving different functions such as housing an air inlet (120) and an air outlet (13). The tread (10) is mounted on a support (14) which is itself supported by a front arm (15) and a rear arm (16). The front arm (15) is journalled on the central portion of the chassis (8), while the rear arm is journalled at the rear end thereof. The chassis (8) is composed of a support extending from front to rear and according to the invention the motor (9) is attached above the front portion of the chassis (8). To this end the chassis includes four attachment bolts (17) at its front upper portion. The axis (XX') of pivoting of the steering column (3) is formed by a sleeve (18) traversing the front end of the chassis and welded thereto. Preferably the axis (XX') is perpendicular to the general plane of the front end of the chassis. According to a preferred embodiment of the invention, the chassis (8) is composed of a hollow beam serving as a reservoir for the fuel necessary to feed the motor (9). As shown in FIGS. 1-8, the chassis or beam support forms in the longitudinal vertical plane of symmetry (P) an obtuse angle (alpha) which opens upwardly. In this end the chassis (8) includes a front portion (80) towards the rear and downwardly, connected to a rear portion (81) extending towards the rear and upwardly. The sleeve (18) is composed of a tube comprising a hollow center (180) allowing for the passage of the steering column (3). The motor (9), according to the invention, is positioned within the angle (alpha) formed by the junction of the front portion (80) and the rear portion (81) of the chassis. To this end the chassis (8) comprises a front portion (80) extending toward the rear and downwardly, connected to a rear portion extending towards the rear and upwardly. The sleeve (18) crosses perpendicularly with respect to the front portion (80) and the motor (9) is attached behind the sleeve (18) on the upper portion (811) of the front portion (80) of the chassis (8). According to one preferred embodiment of the invention, the rear end of the chassis includes a filling tube (19) closed by a cap (20). The front arm (15) for retention of the tread support is journalled around an axis (21) positioned transversely at the level of the central portion of the chassis (8) while the rear arm (16) is journalled around a transverse axis (220) positioned at the rear portion of the chassis. The rear arm (16) includes an upper bent extension (160) retained at its end by a suspension system (23, 24), well known in itself, which we will not further describe in detail. Suffice it to say that it is composed of a shock absorber (23) around which is positioned a compression spring (24). The shock absorber (23) positioned above the rear portion (81) of the chassis (8) is positioned under the seat (11) and is retained on the chassis by virtue of a vertical flap (25).

The motor (9) activates the drive axis (21) by virtue of a drive train or notched belt (26) and a transmission or variator (27). These elements are positioned, for example, on the left side of the vehicle. The drive system (29) of the tread, composed of two pinions (30) and (31) connected by a chain (32) is positioned on the left side. This entire system (29) is positioned in a closed casing (33) containing oil (34). The front arm (15) for retention of the support of the treads (14) is located on one side of the casing (33) connected by a frontal protection element (35) to another arm (290) positioned on the other side of the vehicle.

Although the snow machine can be provided with an electronic ignition system, start-up motor occurs manually, by virtue of a starter (28) preferably positioned on the right side of the vehicle and in the vicinity of the right hand of the driver.

The cooling of the motor is accomplished by the air inlets (36) through the frontal opening (120). As shown in the drawings, hot air exhaust (37) exits through openings (13) provided in the lateral rear walls of the aerodynamic shell (12) at the level of the operator.

The admission of the necessary air to the carburetor (39), occurs through openings (40) formed in the central portion of the aerodynamic shell (12).

Figure 4:
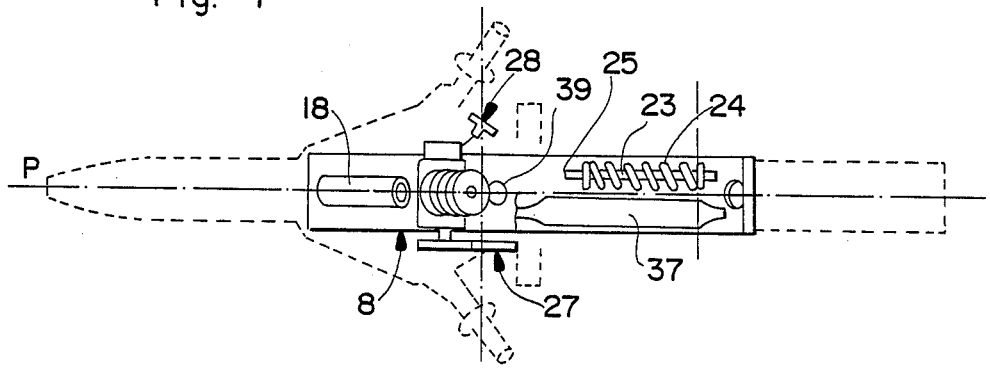
FIG. 4 is a top view illustrating the chassis.
Figure 5:
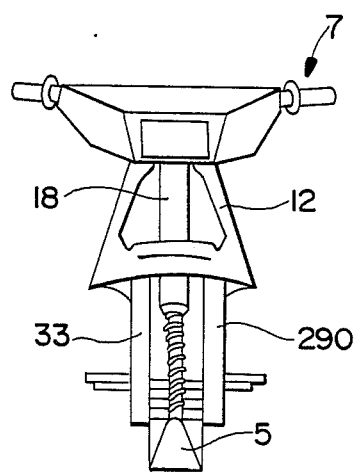
FIG. 5 is a front view of the vehicle.

As may be seen in FIGS. 4 and 7, the rear end of the muffler (37) is positioned above the chassis and adjacent to the suspension system (23, 24).

Figure 9:
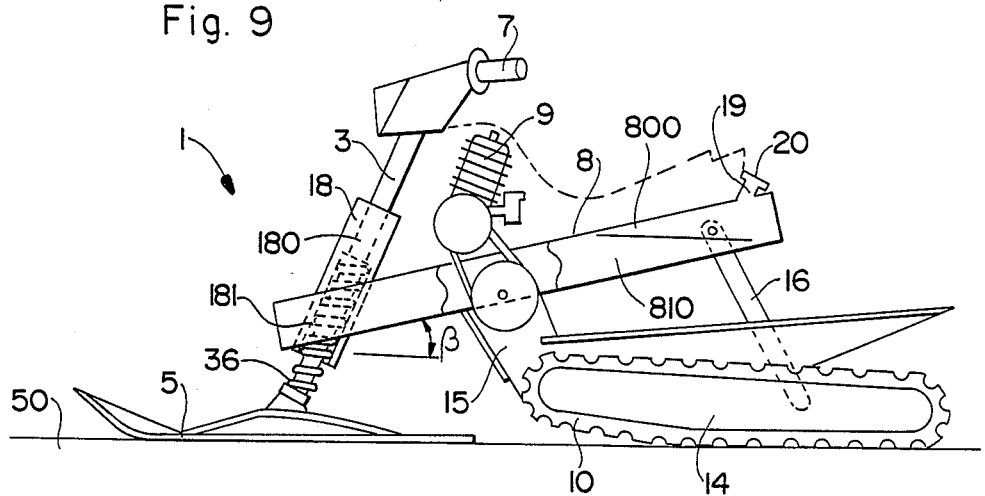
FIG. 9 is a side view similar to FIG. 2 showing an alternative embodiment.
Figure 10:
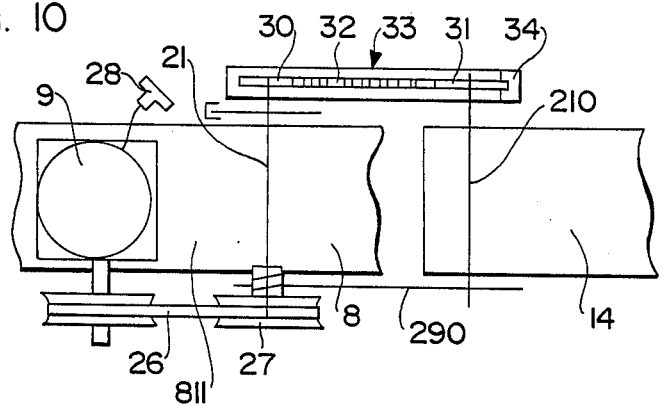
FIG. 10 is a top view illustrating the motor and its transmission to the tread.

FIG. 9 illustrates an alternative embodiment in which the chassis is composed of a support or frame (800) extending towards the rear and upwardly. The chassis is substantially rectilinear and forms an acute angle (beta) with the ground (50). Preferably the chassis frame (800) is a hollow support serving as a reservoir for the fuel (810), and is provided with a filling tube (19) and a closure cap (20). As in the preceding embodiment, the motor (9) is positioned behind the steering column and attached above the front portion of the chassis (8). Similarly, the tread support (14) is retained by a front arm (15) and a rear arm (16) journalled respectively on the chassis around axis (21) and (22) by their upper end which extend downwardly and towards the rear. The lower ends of the said arms are connected respectively to the tread support by two transverse axes (210), (220). The front arm 15 has a length (l) while the rear arm has a length (L) such that the length l is less than the length L. It is seen also (FIG. 2) that the front arm forms an acute angle (A1) while the rear arm (16) forms an angle (A2) such that the angle (A1) is less than the angle (A2).

Of course, the invention is not limited to the embodiments described and illustrated by way of example, but it comprises all technical equivalents as well as their combinations.

From the foregoing description, one skilled in the art can easily ascertain the essential characteristics of this invention and, without departing from the spirit and scope thereof, can make various changes and modification of the invention to adapt it to various usages and conditions.

We claim:

1. A motorized snow vehicle comprising (i) a a rear support assembly comprising a chassis including a support frame and a motor for activating a tread mounted above said support frame, (ii) a steering assembly comprising a steering column pivotally mounted to said rear support assembly and connected at a lower end to a front runner and at its upper end to means for steering, wherein a central portion of the chassis is a traversed transversely by a pivot axis of a front retention arm of a tread support while a rear portion is traversed transversely by a pivot axis of a rear retention arm of the said tread support, wherein said front retention arm and said rear retention arm for support of the tread are inclined from their respective pivot axis on the chassis downwardly and towards the rear, a first length of the front retention arm being less than a second length of the rear retention arm, and (iii) a suspension system operably connected to said tread support positioned above the rear portion of the chassis.

2. A motorized snow vehicle according to claim 1 wherein the chassis has a front portion and the motor is attached to said support frame above the front portion of the chassis.

3. A motorized snow vehicle according to claim 2 wherein said support frame of the chassis includes a forward section extending towards the rear and downwardly, and a rearward section extending towards the rear and upwardly, to form an obtuse angle (alpha) opening upwardly in a longitudinal vertical plane of symmetry of the vehicle.

4. A motorized snow vehicle according to claim 2 wherein the chassis has a rear portion which extends rearwardly and upwardly.

5. A motorized snow vehicle according to claim 4 wherein the steering column pivots within a sleeve positioned substantially perpendicular to a front portion of the chassis.

6. A motorized snow vehicle according to claim 1, comprising a muffler positioned above the rear portion of the chassis.

7. A motorized snow vehicle according to claim 1, wherein the front retention arm forms a first angle towards the front with a substantially horizontal ground surface, and the rear arm forms a second angle greater than said first angle.

8. A motorized snow vehicle according to claim 1, wherein said suspension system is retained above said rear portion of said chassis by means of a vertical retention flap.

9. A motorized snow vehicle comprising (i) a rear support assembly comprising a chassis including a support frame comprising a principal support beam having a forward portion and a rear portion extending upwardly from said forward portion (ii) a motor for activating a tread mounted above said support frame, and (iii) a steering assembly comprising a steering column pivotally mounted to said rear support assembly and connected at a lower end to a front runner and at its upper end to means for steering, wherein a central portion of the chassis is traversed transversely by a pivot axis of a front retention arm of a tread support while a rear portion is traversed transversely by a pivot axis of a rear retention arm of the said tread support, and wherein said front retention arm and said rear retention arm for support of the tread are inclined from their respective pivot axis on the chassis downwardly and towards the rear with a length of the front retention arm being less than another length of the rear retention arm.

10. A motorized snow vehicle according to claim 9, wherein the front retention arm forms a first angle towards the front with a substantially horizontal ground surface, and the rear arm forms a second angle greater than the first angle.

11. A motorized snow vehicle according to claim 10 wherein the motor is attached to said support frame above said front portion.

12. A motorized snow vehicle according to claim 11 wherein said forward portion extends towards the rear and downwardly, and said rear portion extends towards the rear and upwardly, to form an obtuse angle (alpha) opening upwardly in a longitudinal vertical plane of symmetry of the vehicle.

13. A motorized snow vehicle according to claim 12 wherein the steering column pivots within a sleeve positioned substantially perpendicular to a front portion of the chassis.

14. A motorized snow vehicle according to claim 12, comprising a suspension system operably connected to said tread support positioned above the rear portion of the chassis.

15. A motorized snow vehicle according to claim 12, comprising a muffler positioned above the rear portion of the chassis.

16. A motorized snow vehicle according to claim 9 wherein the motor is attached to said support frame above said front portion.

17. A motorized snow vehicle according to claim 16 wherein said forward portion extends towards the rear and downwardly, and said rear portion extends towards the rear and upwardly, to form an obtuse angle (alpha) opening upwardly in a longitudinal vertical plane of symmetry of the vehicle.

18. A motorized snow vehicle according to claim 17 wherein the steering column pivots within a sleeve positioned substantially perpendicular to a front portion of the chassis.

19. A motorized snow vehicle according to claim 9, comprising a suspension system operably connected to said tread support positioned above the rear portion of the chassis.

20. A motorized snow vehicle according to claim 9, comprising a muffler positioned above the rear portion of the chassis.

* * * * *

UNITED STATES PATENT AND TRADEMARK OFFICE
CERTIFICATE OF CORRECTION

PATENT NO. : 4,823,903

DATED : April 25, 1989

INVENTOR(S) : Jean-Claude BIBOLLET et al.

It is certified that error appears in the above-identified patent and that said Letters Patent is hereby corrected as shown below:

At column 1, line 40, change "principaL" to ---principal---.

At column 1, line 51, insert ---present--- before ---invention---.

At column 2, line 45, change "or beam" to ---beam or---.

At column 2, line 47, change "end" to ---embodiment---.

At column 2, line 48, insert ---extending--- after "(30)".

At column 3, line 4, delete [we] after "which".

At column 3, line 14, change ". The" to ---in which case the---.

At column 3, line 24, change "occurs" to ---is preferably activated---.

At column 3, lines 28 and 29, change "the air inlets" to ---passing fresh air streams---.

At column 3, line 59, insert ---with the ground--- after "(A1)".

At column 4, line    change "a a" to ---a--- before "rear".

UNITED STATES PATENT AND TRADEMARK OFFICE
CERTIFICATE OF CORRECTION

PATENT NO. : 4,823,903

DATED : April 25, 1989

INVENTOR(S) : Jean-Claude BIBOLLET et al.

It is certified that error appears in the above-identified patent and that said Letters Patent is hereby corrected as shown below:

```
At column 5, line 10, change "10" to ---9---.
At column 5, line 25, change "12" to ---9---.
At column 6, line 3,  change "12" to ---9---.
At column 6, line 6,  change "9"  to ---10---.
At column 6, line 19, change "9"  to ---17---.
At column 6, line 23, change "9"  to ---17---.
```

Signed and Sealed this

Fifteenth Day of October, 1991

Attest:

HARRY F. MANBECK, JR.

*Attesting Officer*  *Commissioner of Patents and Trademarks*